(12) United States Patent
Duval et al.

(10) Patent No.: US 6,343,993 B1
(45) Date of Patent: Feb. 5, 2002

(54) BALL-TYPE SYSTEM FOR COUPLING TWO SLIDING SHAFTS

(75) Inventors: Benoît Duval, Vendome; Manuel Antonio Onteniente, Saint Ouen Vendome; André Laisement, La Chapelle Encherie; Robin Thomas, Aze, all of (FR)

(73) Assignee: NACAM France S.A., Vendome (FR)

( * ) Notice: Subject to any disclaimer, the term of this patent is extended or adjusted under 35 U.S.C. 154(b) by 0 days.

(21) Appl. No.: 09/598,223

(22) Filed: Jun. 21, 2000

(30) Foreign Application Priority Data

| Jun. 30, 1999 | (FR) | 99-08673 |
| Dec. 16, 1999 | (FR) | 99-15929 |
| Jun. 8, 2000 | (FR) | 00-07326 |

(51) Int. Cl.⁷ .............................................. F16C 3/035
(52) U.S. Cl. .......................... 464/167; 384/49; 74/492
(58) Field of Search ................................ 464/167, 168; 384/49; 74/492, 493

(56) References Cited

U.S. PATENT DOCUMENTS

| 3,318,170 A | * | 5/1967 | Runkle | ..................... 74/493 |
| 4,482,338 A | * | 11/1984 | Walter et al. | ................. 464/167 |
| 4,898,566 A | * | 2/1990 | Hakansson | ................... 74/492 X |
| 6,038,941 A | * | 3/2000 | Hobaugh, II et al. | ........... 74/493 |
| 2001/0006564 A1 | * | 7/2001 | Geyer et al. | ................... 384/49 |

FOREIGN PATENT DOCUMENTS

| DE | 849049 | | 7/1952 | |
| DE | 3124927 | | 3/1983 | |
| DE | 3730393 | | 3/1989 | |
| FR | 1228149 | | 8/1960 | |
| GB | 999492 | * | 7/1965 | ................. 384/49 |
| PK | 108162 | * | 8/1958 | ................. 384/49 |
| SU | 1627758 A1 | * | 2/1991 | ................. 384/49 |
| WO | WO 9620862 | | 7/1996 | |

* cited by examiner

Primary Examiner—Lynne H. Browne
Assistant Examiner—Greg Binda
(74) Attorney, Agent, or Firm—Lawrence E. Laubscher (57) ABSTRACT

A system for coupling an inner shaft and an outer shaft which slide one within the other in the direction of a common axis, the system comprising balls disposed between the inner shaft and the outer shaft in axial grooves on the inner shaft and in axial grooves on the outer shaft. Thrust is applied to each row of balls by an axial coil spring which bears in the groove and which applies thrust to two races of the balls which come into contact with the groove.

22 Claims, 11 Drawing Sheets

BALL-TYPE SYSTEM FOR COUPLING TWO SLIDING SHAFTS

BACKGROUND OF THE INVENTION

1. Field of the Invention

The invention relates to a system for rotationally coupling two shafts which slide along a common axis. The coupling system according to the invention applies in particular to an automobile vehicle steering column, in which it is fitted to the intermediate column part connected to the steering box or to the upper column part connected to the steering wheel.

2. Description of the Prior Art

In the more particular case of the intermediate shaft, this has a universal joint at each end: one universal joint is connected to the motion input of the steering box and the other universal joint is connected to the top of the column. For modern automobile vehicles to be steered correctly it is necessary for the length of the intermediate shaft to be variable and to adapt to oscillations of the front power train of the vehicle caused by the profile and condition of the road surface.

The intermediate shaft must therefore first and foremost be of variable length, i.e. it must have as one function sliding of two shafts relative to each other along a common axis, which is the axis of the intermediate part. It also requires a function of transmitting rotational movement and the rotational torque needed for steering between the two shafts.

There are many sliding shaft coupling devices which transmit torque between the two shafts using splines with conjugate profiles formed on each of the two shafts. However, this type of system suffers from backlash after 150,000 km, which is the expected service life of modern automobiles. To delay the onset of this backlash the sliding of the two shafts is adjusted relatively closely during manufacture, which requires a relatively large axial force on the production line, which increases assembly time and makes assembly more difficult.

The adjustment must be accurate to enable axial movements to be absorbed correctly in operation. When torque is being transmitted the axial force is a function of the torque and axial locking of the two shafts is followed by sudden axial unlocking, which causes jerks which compromise good sliding adjustment with low backlash and the feeling of being in control.

OBJECT OF THE INVENTION

The object of the present invention is to propose a sliding shaft coupling system which avoids the above drawbacks, i.e. a system which requires an axial force that is not related to the transmitted torque. The axial force therefore has to increase only very slightly as the transmitted torque increases. Moreover, the system coupling the two shafts must be easy to fit into existing spaces available on automobile vehicles, with a low axial fitting force, and there must not be any backlash at the end of its service life.

SUMMARY OF THE INVENTION

The invention relates to a system for coupling an inner shaft and an outer shaft which slide one within the other in the direction of a common axis, said system including rolling members which are disposed between said inner shaft and said outer shaft. Each of said rolling members is disposed in a concave part of said inner shaft and in a concave part of said outer shaft. Each of said rolling members is associated with at least one spring member which is disposed between said rolling member and the corresponding concave part of one of said shafts.

Said rolling members are arranged in a plurality of axial rows. Each axial row of rolling members is disposed in a concave part of the inner shaft in the form of an axial groove and in a concave part of an outer shaft in the form of an axial groove. One of the two concave parts in the form of an axial groove includes a back and two flanks to receive two races in the form of an axial bar. Each race is disposed between the corresponding rolling members and one of the flanks of the axial groove. At least one spring member is disposed between the back of the axial groove and each of the two races in order to press the races against the corresponding rolling members.

When no torque is transmitted, each rolling member is always in bearing engagement on the same side as said spring member(s) and on the opposite side and so that when torque is transmitted there is for each rolling member at least one bearing area on the same side as said spring member(s) and at least one bearing area on the opposite side.

Preferably, in accordance with the invention, the rolling members are balls.

In different embodiments of the invention, each ball is provided with three spring members which are disposed between the corresponding concave part and said ball. Each spring member is a spring with a bearing shoe in bearing engagement with the corresponding ball.

In one embodiment of the invention, each ball moves on two races which are pressed against said ball by the same corresponding spring member and said races are disposed between said ball and the corresponding spring member.

In another embodiment of the invention, each ball moves on two races and is associated with two spring members, each race is pressed against said ball by the corresponding spring member and each race is disposed between said ball and the corresponding spring member.

To prevent the balls rubbing against each other, the balls are disposed in at least one retaining cage.

To make the operation of the coupling device according to the invention safer, male grooves and female grooves with conjugate profiles and with some clearance are formed on said inner and outer shafts so that torque can still be transmitted between said inner shaft and said outer shaft if said balls rupture.

Various coupling system structures can be designed. In one structure, the spring member or each of said spring members is disposed in said inner shaft. In another structure, the spring member or each of said spring members is disposed in said outer shaft.

In a further structure, some spring members are disposed in said inner shaft and others springs in said outer shaft.

In one particularly well-balanced embodiment of the coupling system, the balls are disposed in three axial rows and said axial rows are at 120° to each other in a transverse plane, the inner shaft has three axial grooves which are at 120° to each other in said transverse plane, and the outer shaft has three axial grooves which are at 120° to each other in said transverse plane.

In another particularly well-balanced embodiment of the coupling system, the balls are disposed in two diametrally opposed axial rows. The inner shaft has two diametrally opposed axial grooves; and the outer shaft has two diametrally opposed axial grooves.

In one complete architecture of the coupling system according to the invention, the inner shaft has three axial grooves which are at 120° to each other in a transverse plane and a spring member in the form of an axial coil spring and two races in the form of an axial bar are disposed in each axial groove; the balls are disposed in three axial rows which are at 120° to each other in the transverse plane and said balls are held in place relative to each other by a cage in the form of a sleeve; the assembly comprising said sleeve, said balls, said races and said axial coil springs is closed at each axial end by a retaining ring which engages in each of said axial grooves of said inner shaft and one of said retaining rings bears against a ring which is mounted in a groove in said inner shaft; and the outer shaft has three axial grooves which are at 120° to each other in the transverse plane and which slide on said rows of balls and said axial grooves have the length required to enable the required axial sliding of said outer shaft and said inner shaft.

The coupling system according to the invention applies to the intermediate part of an automobile vehicle steering column or to the top part of an automobile vehicle steering column.

The system according to the invention for coupling two shafts along a common axis therefore has the advantage of establishing bearing contact through rolling balls at all times, which balls are always in contact, even if no torque is transmitted.

Also, the axial force required during fitting on the production line is low. The accurate adjustment of the coupling system of the invention avoids axial jerks when driving the vehicle and guarantees durability by preventing backlash in the coupling system. Also, when torque is being transmitted, the axial force does not depend on the torque. Finally, the coupling system is easy to fit into the existing space for automobile vehicle steering columns.

BRIEF DESCRIPTION OF THE DRAWINGS

Further features and advantages of the invention will become apparent from the following particular description of several preferred embodiments of the invention shown in the corresponding accompanying diagrammatic drawings, in which.

DESCRIPTION OF THE PREFERRED EMBODIMENTS

The invention relates to a system for rotationally coupling two shafts which slide one within the other along a common axis.

Figure 1:
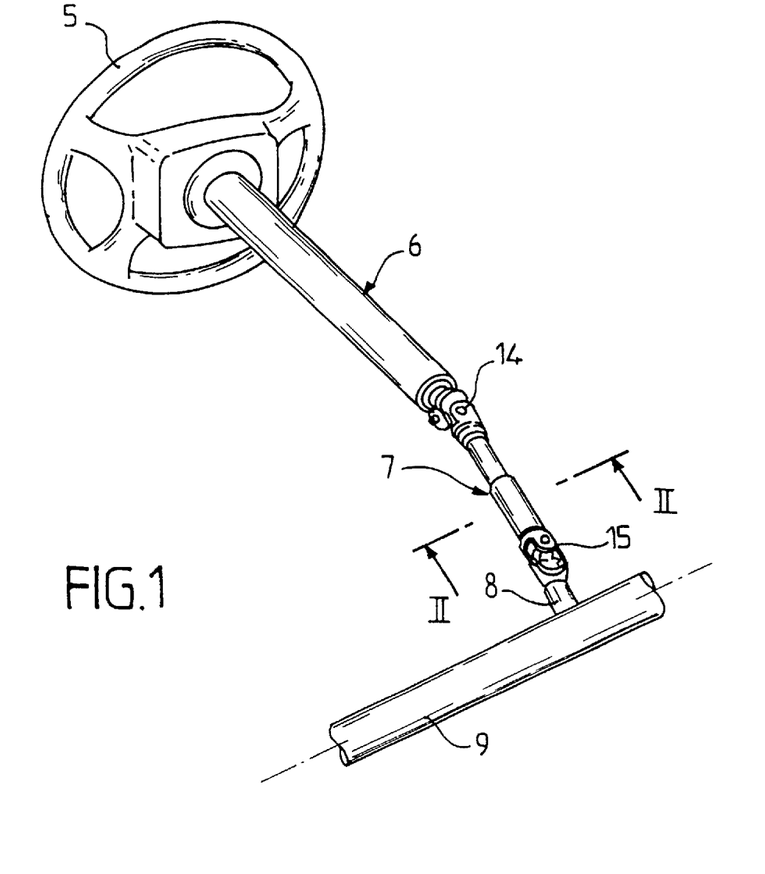
FIG. 1 is a perspective view of an automobile vehicle steering system in which the coupling system of the invention is applied to the intermediate part of the steering column.

The coupling system applies in particular to an automobile vehicle steering system, like the one shown diagrammatically in FIG. 1.

The steering system shown includes a steering column with a top column part 6 and an intermediate column part 7 also referred to as the intermediate shaft.

The top column part 6 is connected at its upper end to the steering wheel 5 and at its lower end to the intermediate column part 7.

The intermediate column part 7 is connected at its upper end to the top column part 6 and at its lower end to the steering box 8 of the steering rack 9.

The intermediate column part 7 has a universal joint at each end, namely a universal joint 14 by which it is connected to the top column part 6 and a universal joint 15 by which it is connected to the steering box 8.

The following description refers to a coupling system according to the invention which is part of the intermediate column part 7. The coupling system can equally well be provided in the top column part 6.

Figure 2:
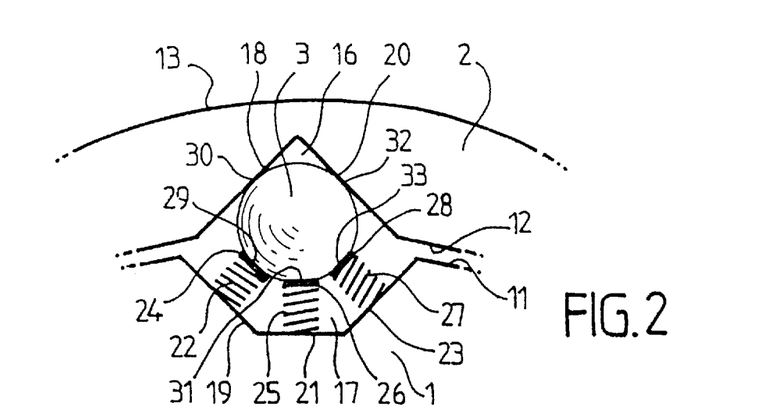
FIG. 2 is a partial view in section taken along the line II—II in FIG. 1.

FIG. 2 is a partial view in cross section of the intermediate column part 6, showing the theory of the system according to the invention for rotationally coupling two shafts.

Figures 3, 4:
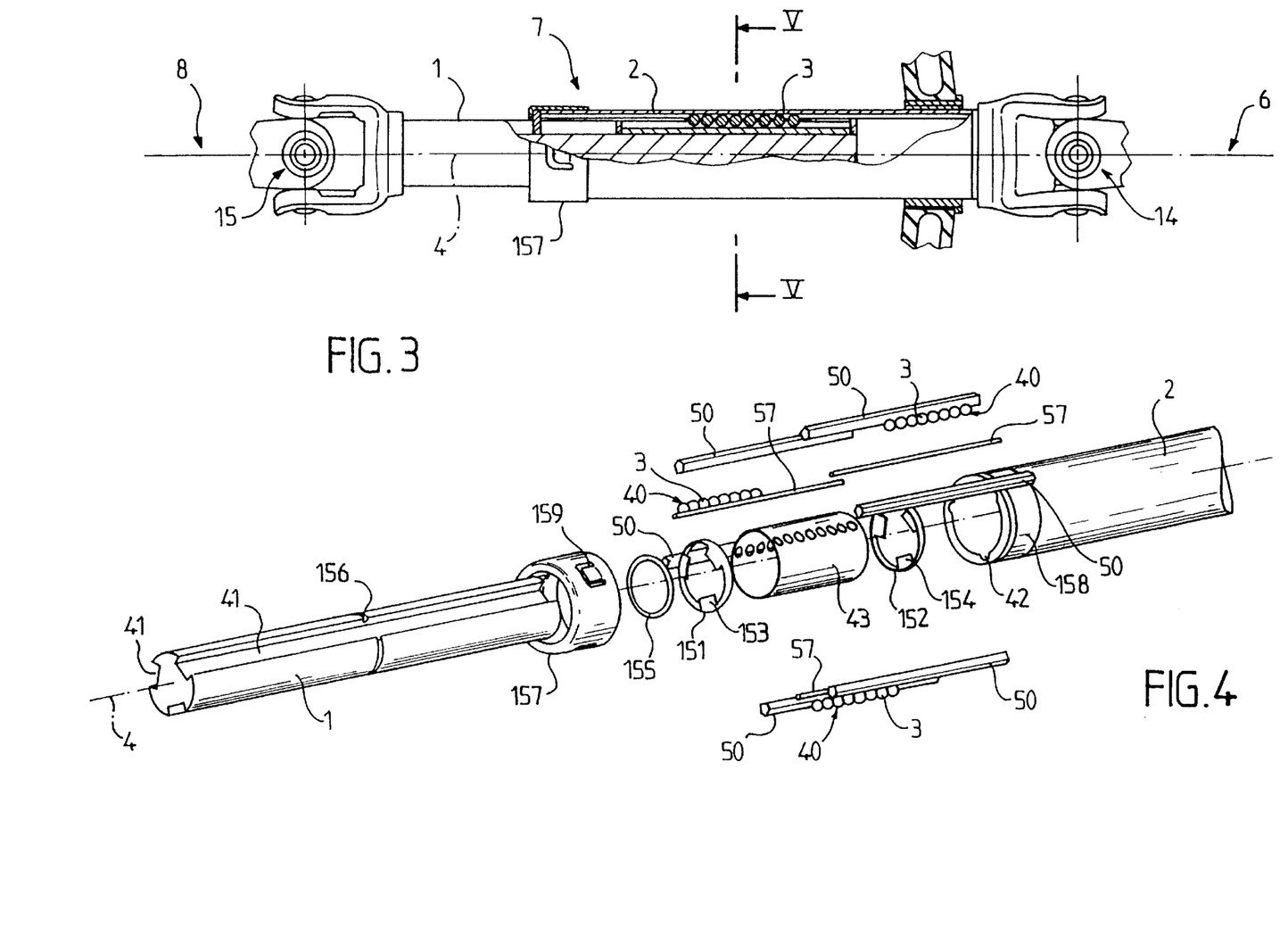
FIG. 3 is an axial view of the intermediate part of the automobile vehicle steering system shown in FIG. 1, partly in axial section, relating to a different embodiment of the invention.
FIG. 4 is an exploded perspective view of the coupling system shown in FIG. 3.

An inner shaft 1 and an outer shaft 2 slide one within the other in the direction of a common axis 4 which is shown in FIGS. 3 and 4. The system for coupling the two shafts includes rolling members which take the form of balls 3 in the various embodiments described hereinafter. The balls 3 are disposed between the inner shaft 1 and the outer shaft 2. In the coupling system according to the invention each of said rolling members or balls 3 is disposed in a concave part 17 of the inner shaft 1 and in a concave part 16 of the outer shaft 2.

Each of said rolling members or balls 3 is associated with at least one spring member which is disposed between said rolling member or ball 3 and the corresponding concave part 17 of the inner shaft 1. The spring member(s) can instead be disposed between the rolling member or ball 3 and the corresponding concave part 16 of the outer shaft 2.

When the coupling system is at rest, i.e. when no torque is being transmitted, each rolling member or ball 3 is always in bearing engagement on the same side as the spring member(s) and always in bearing engagement on the opposite side. When the coupling system is transmitting torque there is for each rolling member or ball 3 one bearing area on the same side as the spring member(s) and one bearing area on the opposite side.

In FIG. 2, each ball 3 is disposed in the concave part 16 of the outer shaft 2. The concave part 16 has two curved faces 18 and 20 which are inclined to each other so that there is one area 30 of bearing engagement between the ball 3 and the curved face 18 and another area 32 of bearing engagement between the ball 3 and the curved face 20.

Each ball 3 is also disposed in the concave part 17 of the inner shaft 1. The concave part 17 has a back 21 and two flanks 19 and 23 which in FIG. 2 are inclined to the back 21.

A spring member or spring 22 is disposed between the flank 19 and the ball 3. Another spring member or spring 25 is disposed between the back 21 and the ball 3. Another spring member or spring 27 is disposed between the flank 23 and the ball 3.

Also, a bearing shoe 24 is disposed between the spring 22 and the ball 3 so that there is an area 29 of bearing engagement between the ball 3 and the bearing shoe 24. Another bearing shoe 26 is disposed between the spring 25 and the ball 3 so that there is an area 31 of bearing engagement between the ball 3 and the bearing shoe 26. Finally another bearing shoe 28 is disposed between the spring 27 and the ball 3 so that there is an area 33 of bearing engagement between the ball 3 and the bearing shoe 28.

In one embodiment there is only one spring member or spring 25 between the back 21 and the bearing shoe 26 of the ball 3 with a single area 31 of bearing engagement.

In another embodiment two spring members are used, namely the springs 22 and 27. The spring 22 is disposed between the flank 19 and the bearing shoe 24 of the ball 3 with an area 29 of bearing engagement. The spring 27 is disposed between the flank 23 and the bearing shoe 28 of the ball 3 with an area 33 of bearing engagement.

The whole of the intermediate column part 7 is shown in axial view in FIG. 3. The inner shaft 1 and the outer shaft 2 slide with the balls 3 along a common axis 4. The intermediate column part 7 is connected to the steering box 8 by the universal joint 15 and to the top column part 6 by the universal joint 14.

Figures 5, 6, 7:
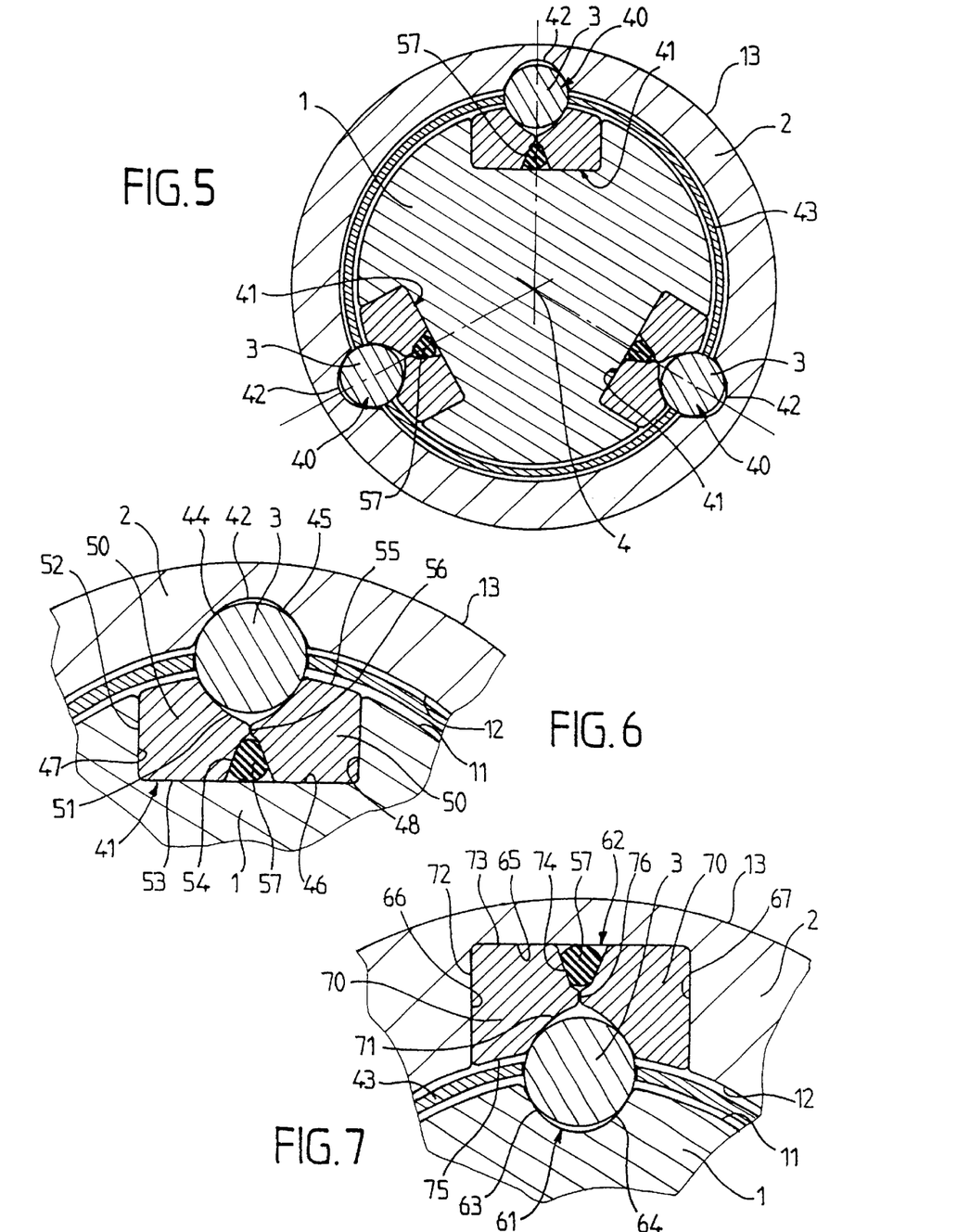
FIG. 5 is a view in cross section taken along the line V—V in FIG. 3.
FIG. 6 shows part of FIG. 5 to a larger scale.
FIG. 7 is a partial view in cross section analogous to FIG. 6 of another embodiment of the invention.

The coupling system is shown in the form of an exploded view in FIG. 4 and in cross section in FIGS. 5 and 6. It includes balls 2 which are disposed in three axial rows 40. The axial rows 40 are at 120° to each other in the transverse direction. The inner shaft 1 has three axial grooves 41 at 120° to each other in the transverse direction. The outer shaft 2 has three axial grooves 42 at 120° to each other in the transverse direction.

The balls 3 are held in place relative to each other by a single cage 43.

For each row 40 of balls 3 there is a concave part in the outer shaft 2 in the form of the axial groove 42 whose cross section includes two concave faces 44, 45 which are inclined to each other and which are in bearing engagement with the balls 3.

For each row 40 of balls 3 there is a concave part in the inner shaft 1 in the form of the axial groove 41 whose cross section includes a back 46 and two flanks 47 and 48. The back 46 is substantially perpendicular to the diametral plane passing through its center.

For each row 40 of balls 3 there are two races 50 which are disposed in the concave part of the inner shaft 1 in the form of the axial groove 41. Each race 50 is in the form of an axial bar. The section of each race 50 has:

a concave face 51 in bearing engagement with the balls 3, two faces 53 and 52 which are contiguous with each other and respectively face the back 46 and one of the flanks 47 and 48 of the axial groove 41, and a face 54 inclined to the back 46 of the axial groove 41.

For each row 40 of balls 3 a spring member in the form of a circular section axially extending resilient member 57 is disposed in the axial groove 41 between the two races 50. The axially extending resilient member 57 bears on the back 46 of the axial groove 41 in order to press on the inclined face 54 of each of the two races 50. The resilient member is formed from rubber or other compressible resilient material.

In the embodiment shown in FIG. 7 the balls 3 are disposed in three axial rows 40. The axial rows 40 are at 120° to each other in the transverse direction. The balls 3 are held in place relative to each other by a single cage 43.

For each row 40 of balls 3 a concave part is formed in the inner shaft 1 in the form of the axial groove 61 whose section includes two concave faces 63, 64 which are inclined to each other and which are in bearing engagement with the balls 3.

For each row 40 of balls 3 a concave part is formed in the outer shaft 2 in the form of an axial groove 62 whose section includes a back 65 and two flanks 66 and 67. The back 65 is substantially perpendicular to the diametral plane passing through its center.

For each row 40 of balls 3 there are two races 70 which are disposed in the concave part of the outer shaft 2 in the form of the axial groove 62. Each race 70 is in the form of an axial bar. The section of each race 70 has:

a concave face 71 in bearing engagement with the balls 3, two faces 73 and 72 which are contiguous and which respectively face the back 65 and one of the flanks 66 or 67 of the axial groove 62, and a face 74 inclined to the back 65 of the axial groove 62.

For each row 40 of balls 3 a resilient member in the form of a circular section resilient member 57 is disposed in the axial groove 62 between the two races 70. The resilient member 57 bears on the back 65 of the axial groove 62 in order to apply thrust to the inclined face 74 of each of the two races 70.

Figure 8:
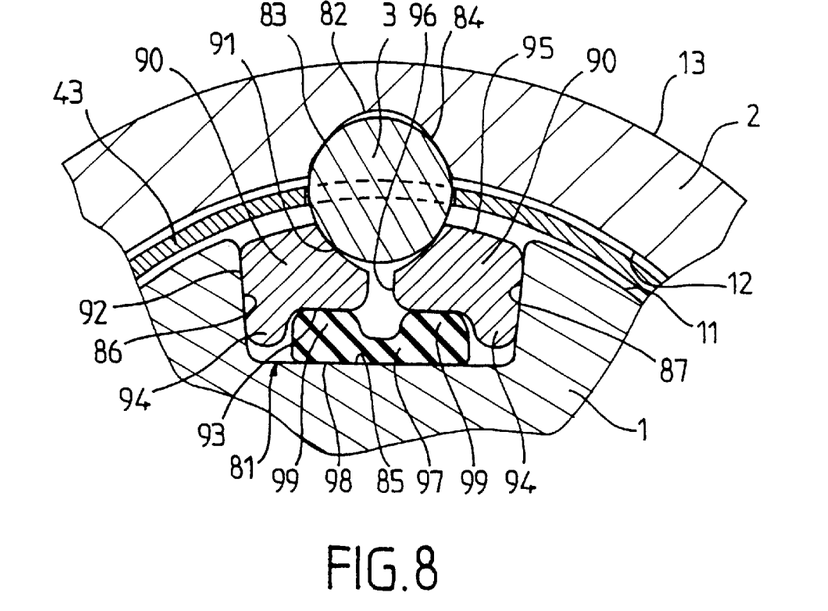
FIG. 8 is a partial view in cross section analogous to FIG. 6 of another embodiment of the invention.

In the embodiment shown in FIG. 8 the balls 3 are disposed in a plurality of axial rows 40. The balls 3 are held in place relative to each other by a single cage 43.

For each row 40 of balls 3 a concave part is formed in the outer shaft 2 in the form of an axial groove 82 whose section includes two concave faces 83, 84 which are inclined to each other and which are in bearing engagement with the balls 3.

For each row 40 of balls 3 a concave part is formed in the inner shaft 1 in the form of an axial groove 81 whose section has a back 85 and two flanks 86 and 87. The back 85 is substantially perpendicular to the diametral plane passing through its center.

For each row 40 of balls 3 there are two races 90 which are disposed in the concave part in the inner shaft 1 in the form of the axial groove 81. Each race 90 is in the form of an axial bar. The section of each race 90 has:

a concave face 91 in bearing engagement with the balls 3, two faces 93 and 92 which are contiguous with each other and which respectively face the back 85 and one of the flanks 86 and 87 of the axial groove 81, and a bead 94 formed on the face 93 at the corner of the face 92.

For each row 40 of balls 3 there is a resilient member in the form of an axially extending resilient member 97 whose section has an axial base 98 and two axial protuberances 99. Said axially extending resilient member 97 is disposed in the axial groove 81 between the beads 94 of the two races 90. The axial base 98 bears on the back 85 of the axial groove 81 so that each of the two axial protuberances 99 applies thrust to the corresponding race 90.

Figure 9:
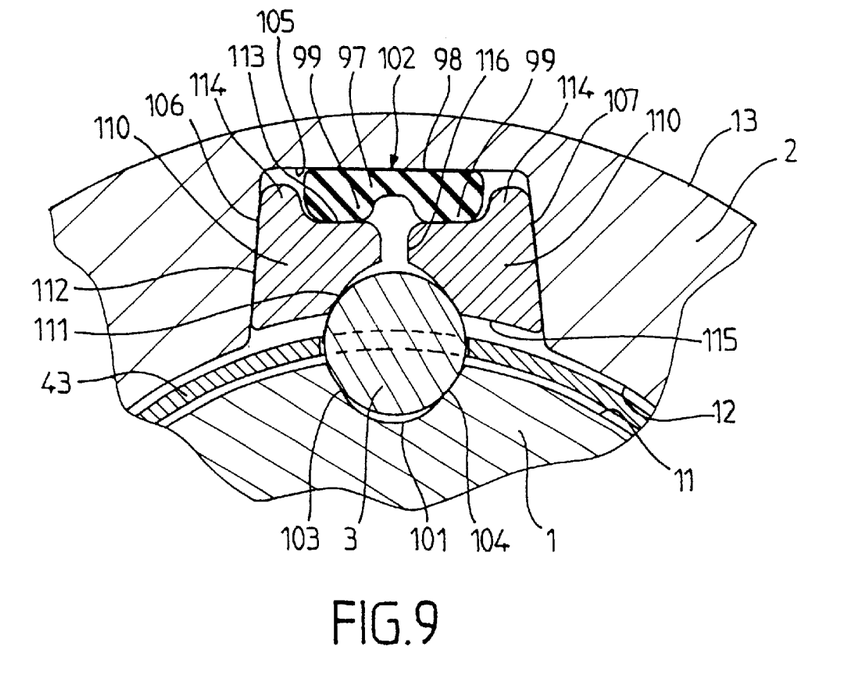
FIG. 9 is a partial view in cross section analogous to FIG. 6 of another embodiment of the invention.

In the embodiment shown in FIG. 9 the balls 3 are disposed in a plurality of axial rows 40. The balls are held in place relative to each other by a single cage 43.

For each row 40 of balls 3 a concave part is formed in the inner shaft 1 in the form of an axial groove 101 whose section includes two curved faces 103, 104 which are inclined to each other and which are in bearing engagement with the balls 3.

For each row 40 of balls 3 a concave part is formed in the outer shaft 2 in the form of an axial groove 102 whose section includes a back 105 and two flanks 106 and 107. The back 105 is substantially perpendicular to the diametral plane passing through its center.

For each row 40 of balls 3 there are two races 110 which are disposed in the concave part of the outer shaft 2 in the form of the axial groove 102. Each race 110 is in the form of an axial bar. The section of each race 110 has:

a concave face 111 in bearing engagement with the balls 3, two faces 113 and 112 which are contiguous with each other and which respectively face the back 105 and one of the flanks 106 or 107 of the axial groove 101, a bead 114 formed on the face 113 at the corner of the face 112.

For each row 40 of balls 3 there is a spring member in the form of an axial resilient member 97 whose section has an axial base 98 and two axial protuberances 99. The axial resilient member 97 is disposed in the axial groove 102 between the beads 114 of the two races 110. The axial base 98 bears on the back 105 of the axial groove 102 so that each of the two axial protuberances 99 applies thrust to the corresponding race 110.

Figure 10:
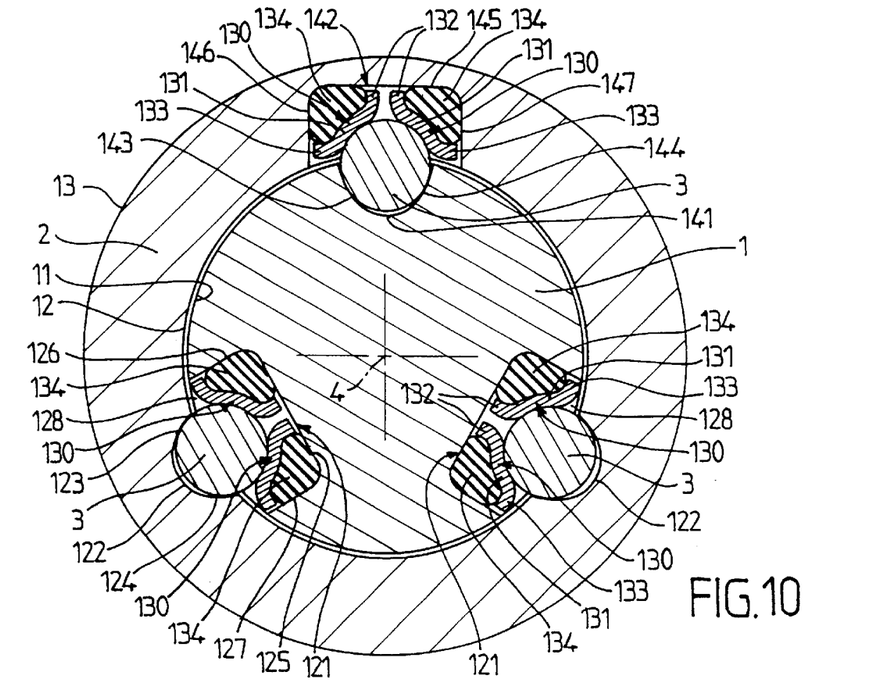
FIG. 10 is a partial view in cross section analogous to FIG. 5 of another embodiment of the invention.

In the embodiment shown in FIG. 10 the balls 3 are disposed in three axial rows 40. The axial rows 40 are at 120° to each other in the transverse direction. The balls 3 of each axial row 40 are held in place relative to each other by a cage 128. There are therefore three cages 128.

For two of the three rows 40 of balls 3 a concave part is formed in the outer shaft 2 in the form of an axial groove 122 whose section includes two curved faces 123 and 124 which are inclined to each other and which are in bearing engagement with the balls 3.

For each row 40 of balls 3 a concave part is formed in the inner shaft 1 in the form of the axial groove 121 whose section includes a back 125 and two flanks 126 and 127. The back 125 is substantially perpendicular to the diametral plane passing through its center.

For each row 40 of balls 3 there are two races 130 which are disposed in the concave part of the inner shaft 1 in the form of the axial groove 121. Each race 130 is in the form of an axial bar whose section has a curved shape 131 in order to come into bearing engagement with the balls 3. Each race 130 has two folded over ends 132 and 133.

For each row 40 of balls 3 two spring members in the form of axial resilient members 134 are disposed in the axial groove 121. Each resilient member 134 bears on the back 125 and on one of the flanks 126 or 127 of the axial groove 121 in order to apply thrust to the corresponding race 130.

Figure 11:
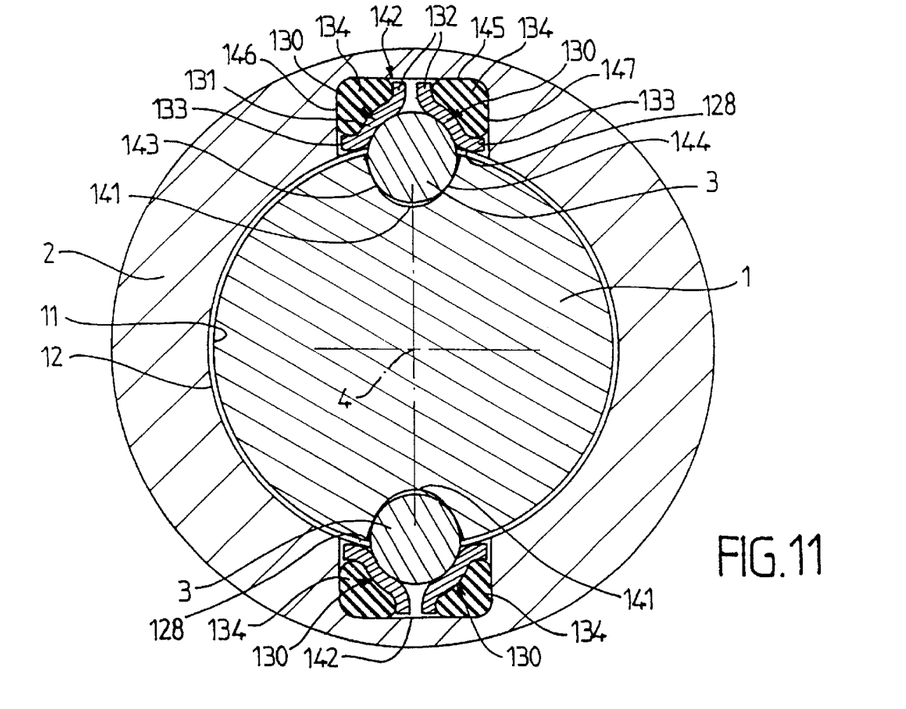
FIG. 11 is a partial view in cross section analogous to FIG. 5 of another embodiment of the invention.

In the embodiment shown in FIG. 11 the balls 3 are disposed in two axial rows 40. The axial rows 40 are diametrally opposed in the transverse direction. The balls 3 of each axial row 40 are held in place relative to each other by a cage 128. There are therefore two cages 128.

In the following description, the expression "each 20 row of balls 40" relates to the third row of balls from FIG. 10 not described and to the two rows of balls from FIG. 11.

For each row 40 of balls 3, a concave part is formed in the inner shaft 1 in the form of an axial groove 141 whose section includes two curved faces 143, 144 which are inclined to each other and in bearing engagement with the balls 3.

For each row 40 of balls 3, a concave part is formed in the outer shaft 2 in the form of an axial groove 142 whose section includes a back 145 and two flanks 146 and 147. The back 145 is substantially perpendicular to the diametral plane passing through its center.

For each row 40 of balls 3 there are two races 130 which are disposed in the concave part of the outer shaft 2 in the form of the axial groove 142. Each race 130 is in the form of an axial bar whose section has a curved shape 131 in order to come into bearing engagement with the balls 3. Each race 130 has two folded over ends 132 and 133.

For each row 40 of balls 3 two spring members in the form of axial coil springs 134 are disposed in the axial groove 142. Each spring member 134 bears on the back 145 and on one of the flanks 146 or 147 of the axial groove 142 in order to apply thrust to the corresponding race 130.

Figure 12:
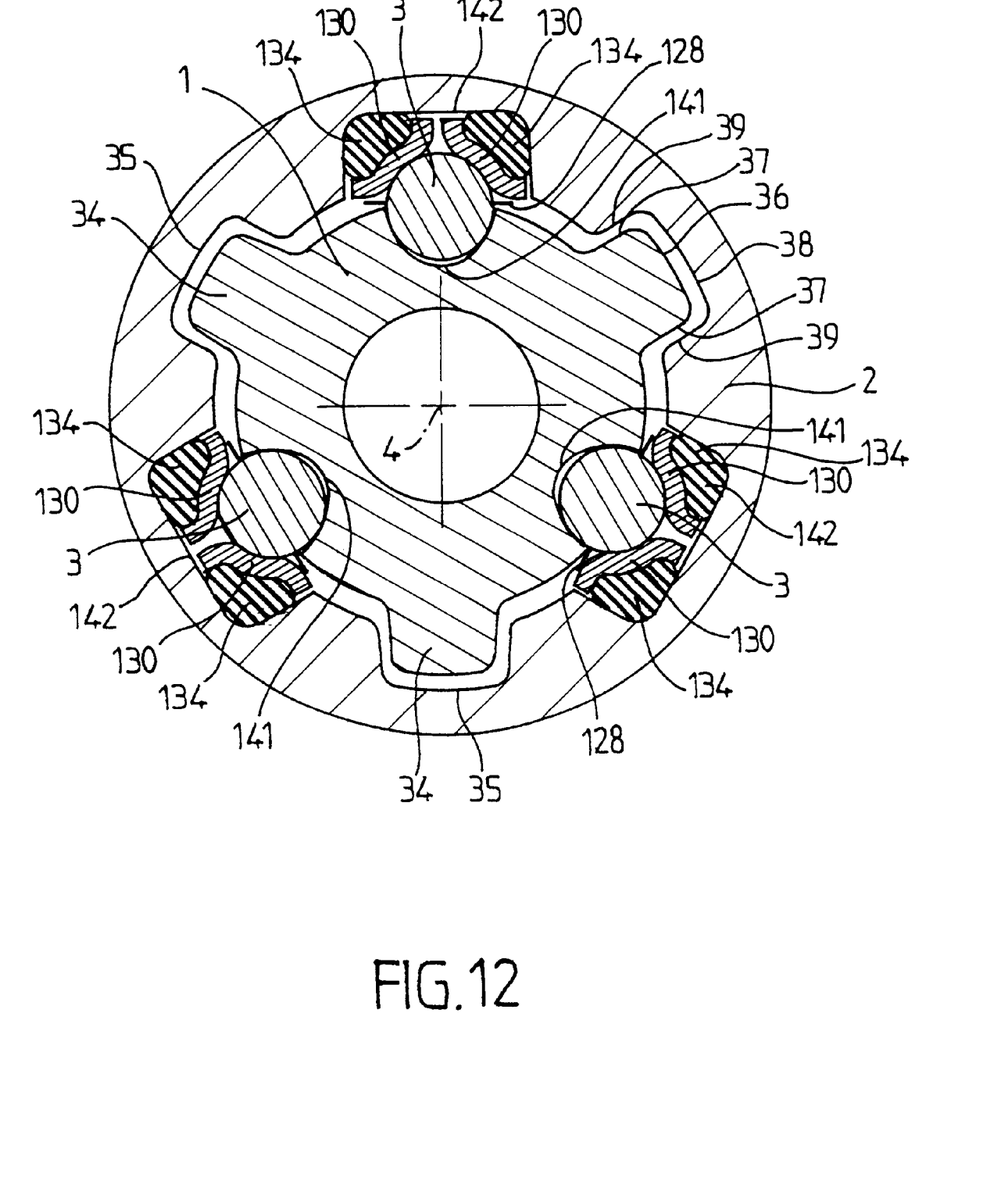
FIG. 12 is a partial view in cross section analogous to FIG. 5 of another embodiment of the invention.

As can be seen in FIG. 12, male projections 34 and female grooves 35 which have conjugate profiles with some clearance are formed on the inner shaft 1 and the outer shaft 2. Thus torque can still be transmitted between the inner shaft 1 and the outer shaft 2 if the balls 3 should rupture.

According to the invention, and regardless of the embodiment of the spring members used, the resilient members 57, 97 or 134 are disposed in the inner shaft 1 or in the outer shaft 2 or some in the inner shaft 1 and the others in the outer shaft 2.

Also, regardless of which embodiment of the spring member is used, the balls 3 can be disposed in a plurality of axial rows 40 and in particular in two diametrally opposed axial rows 40 or in three axial rows 40 at 120° to each other in the transverse direction.

In the embodiment shown in FIGS. 3 and 4 the inner shaft 1 has three axial grooves 41. The axial grooves 41 are at 120° to each other in the transverse direction. A spring member in the form of a resilient member 57 and two races 50 in the form of axial bars are disposed in each axial groove 41.

The balls 3 are disposed in three axial rows 40. The axial rows are at 120° to each other in the transverse direction. The balls are held in place relative to each other by a cage in the form of a sleeve 43.

The assembly of the sleeve 43, the balls 3, the races 50 and the resilient members 57 is closed at each axial end by a retaining ring 151 and 152. Tenons 153 and 154 of each retaining ring 151 and 152 are engaged in each of the axial grooves 41 of the inner shaft 1. One of the retaining rings 151 bears against a ring 155 which is mounted in a groove 156 on the inner shaft 1.

The outer shaft 2 has three axial grooves 42 at 120° to each other in the transverse direction. The axial grooves 42 slide on the rows 40 of balls 3. The length of the axial grooves 42 enables the required axial sliding of the outer shaft 2 and the inner shaft 1.

The arrangement of FIGS. 3 and 4 can also in particular be applied to the axial grooves 81 and 82 with the races 90 and the resilient member 97 (FIGS. 8 & 9).

The various embodiments with spring members on the inner shaft and/or the outer shaft also apply to the embodiments of the invention shown in FIGS. 13 to 18.

Figures 13, 16, 17, 18:
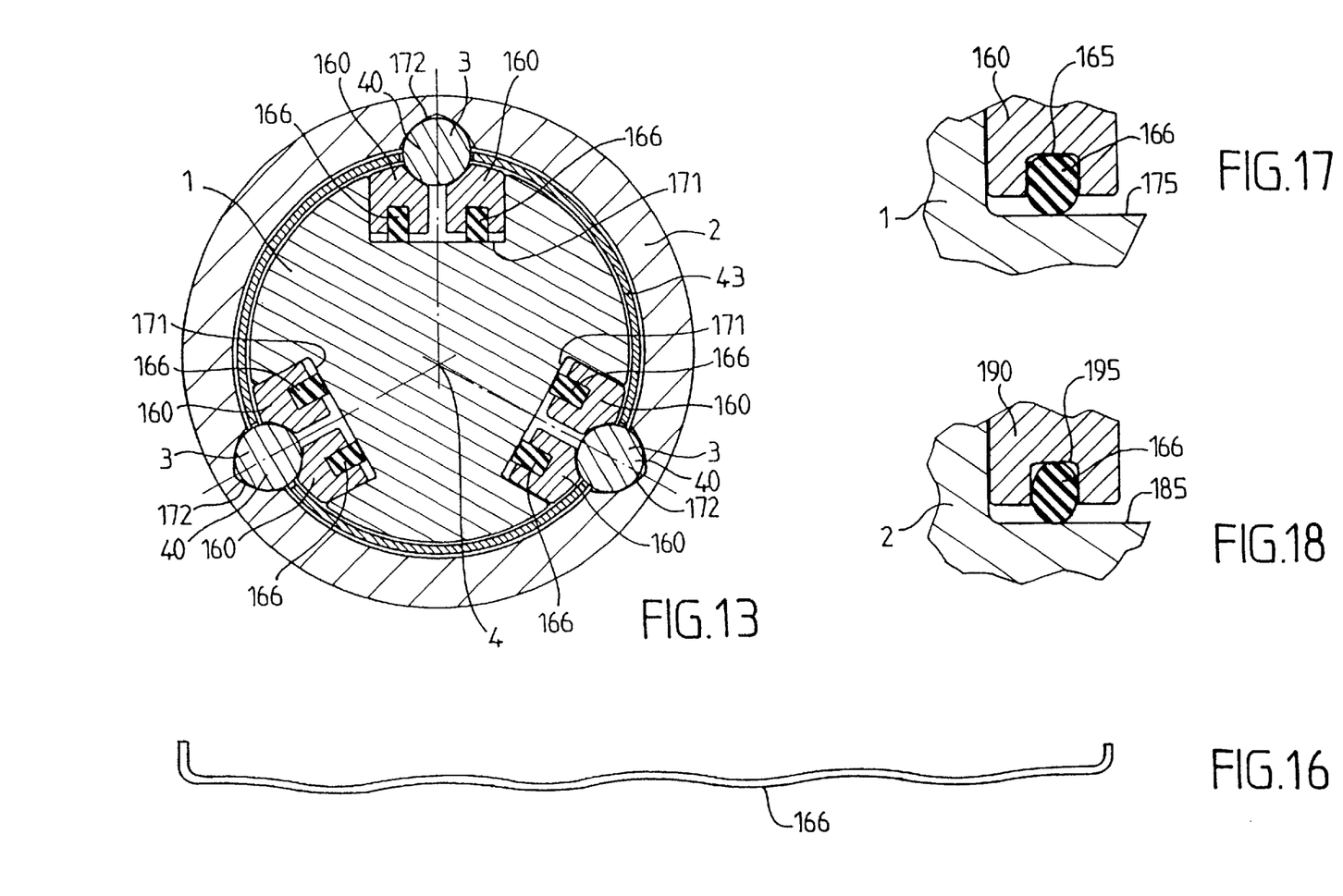
FIG. 13 is a partial view in cross section analogous to FIG. 5 of another embodiment of the invention.
FIG. 16 shows one embodiment of an axial elastic member according to the invention.
FIG. 17 is a partial view in cross section corresponding to FIG. 14 with a different embodiment of the axial spring member.
FIG. 18 is a partial view in cross section corresponding to FIG. 15 with a different embodiment of the axial spring member.
Figure 14:
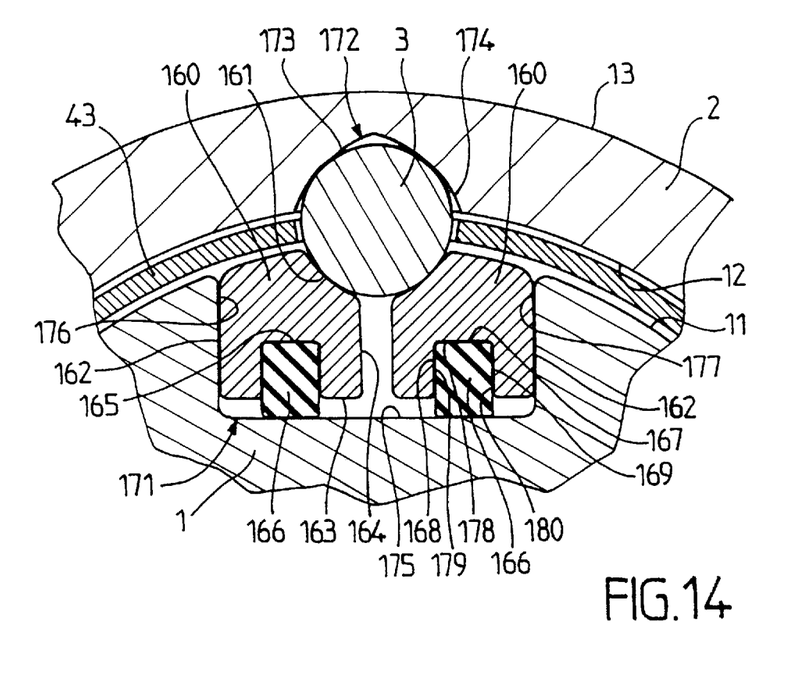
FIG. 14 shows part of FIG. 13 in cross section and to a larger scale.

In the embodiment shown in FIGS. 13 and 14 the balls 3 are disposed in three axial rows 40. The axial rows 40 are at 120° to each other in the transverse direction. The balls 3 of each axial row 40 are held in place relative to each other by a single cage 43.

For each row 40 of balls 3 a concave part is formed in the outer shaft 2 in the form of an axial groove 172 whose section includes two curved faces 173 and 174 which are inclined to each other and which come into bearing engagement with the balls 3.

For each row 40 of balls 3 a concave part is formed in the inner shaft 1 in the form of an axial groove 171 whose section includes a back 175 and two flanks 176 and 177. The back 175 is substantially perpendicular to the diametral plane passing through its center.

For each row 40 of balls 3 two races 160 are disposed in the concave part of the inner shaft 1 in the form of the axial groove 171. Each race 160 is in the form of an axial bar.

The section of each race 160 includes:

a face 161 in bearing engagement with the balls 3;

two faces 163 and 162 which are contiguous with each other and which respectively face the back 175 and one of the flanks 176 or 177 of the axial groove 171; and a face 164 contiguous with the face 163, facing the back 175 of the axial groove 171 and substantially perpendicular to the face 163. The two faces 164 of the races 160 are substantially parallel to the diametral plane passing through the center of the back 175. The space between the two faces 164 provides sufficient clearance at rest and when torque is being transmitted.

For each row of bas 3 two resilient members in the form of resilient members 166 are each disposed in an axial groove 165 formed in the corresponding race 160. Each resilient member 166 bears on the back 175 of the axial groove 171 in order to apply thrust to the corresponding race 160.

Figure 15:
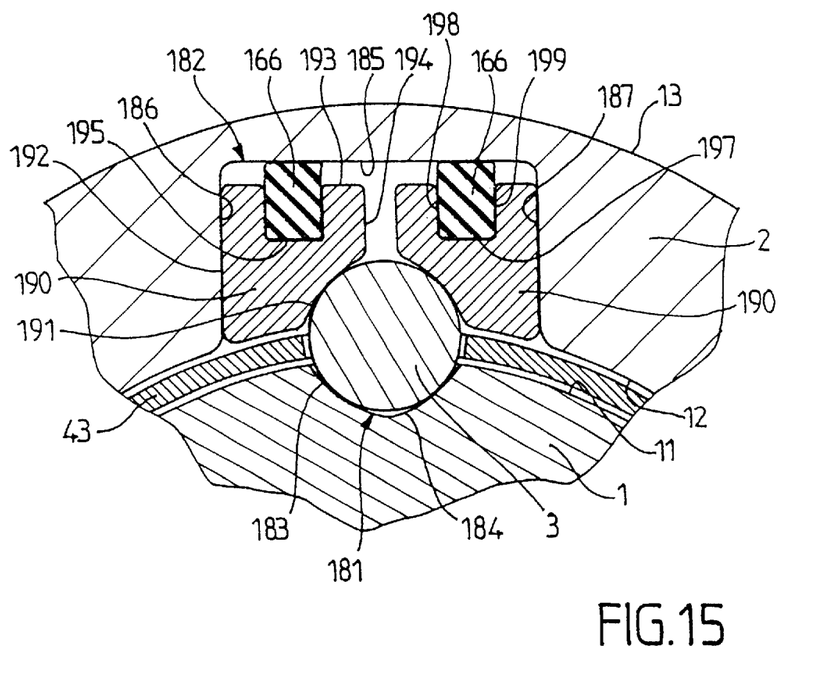
FIG. 15 is a partial view in cross section analogous to FIG. 14 relating to another embodiment of the invention.

Each resilient member 166 has a square or rectangular section with a base 178 and two sides 179 and 180, as shown in FIGS. 13, 14 and 15.

Each axial groove. 165 has a back 167 and two sides 168 and 169 which are dimensioned to receive the corresponding spring member 166.

In the embodiments shown in FIGS. 17 and 18 a resilient member 166 is provided which has either a circular section as shown in FIG. 17 or an oval section as shown in FIG. 18.

In another embodiment of the invention, shown in FIG. 16, the axial spring member 166 is a metal spring having a shape matching the corresponding groove 165 or 195 of the race 160 or 190, so as to press on the back 175 or 185 and apply thrust to the corresponding race 160 or 190. The metal spring can be as shown in FIG. 16.

In the embodiment shown in FIG. 15, the balls 3 are disposed in three axial rows 40. The axial rows 40 are at 120° to each other in the transverse direction. The balls 3 of each axial row 40 are held in place relative to each other by a single cage 43.

For each row 40 of balls 3 a concave part is formed in the inner shaft 1 in the form of an axial groove 181 whose section includes two curved faces 183, 184 which are inclined to each other and which are in bearing engagement with the balls 3.

For each row 40 of balls 3 a concave part is formed in the outer shaft 2 in the form of an axial groove 182 whose section includes a back 185 and two flanks 186 and 187. The back 185 is substantially perpendicular to the diametral plane passing through its center.

For each row 40 of balls 3 there are two races 190 in the concave part of the outer shaft 2 in the form of the axial groove 182. Each race 190 is in the form of an axial bar.

The section of each race 190 includes:

a face 191 in bearing engagement with the balls 3;

two faces 193 and 192 which are contiguous with each other and which respectively face the back 185 and one of the flanks 186 or 187 of the axial groove 182; and a face 194 contiguous with the face 193, facing the back 185 of the axial groove 182 and substantially perpendicular to the face 193. The two faces 194 of the races 190 are substantially parallel to the diametral plane passing through the center of the back 185. The space between the two faces 194 provides sufficient clearance at rest and when torque is being transmitted.

For each row 40 of balls 3 two axial spring members 166 are each disposed in an axial groove 195 formed in the corresponding race 190. Each spring member 166 bears on the back 185 of the axial groove 182 in order to apply thrust to the corresponding race 190.

Each axial spring member 166 has a square or rectangular section with a base 178 and two sides 179 and 180.

Each axial groove 195 has a back 197 and two sides 198 and 199 which are dimensioned to receive the corresponding spring member 166.

Other embodiments include a spring member 166 with a circular or oval section or a spring member 166 in the form of a metal spring.

Figure 19:
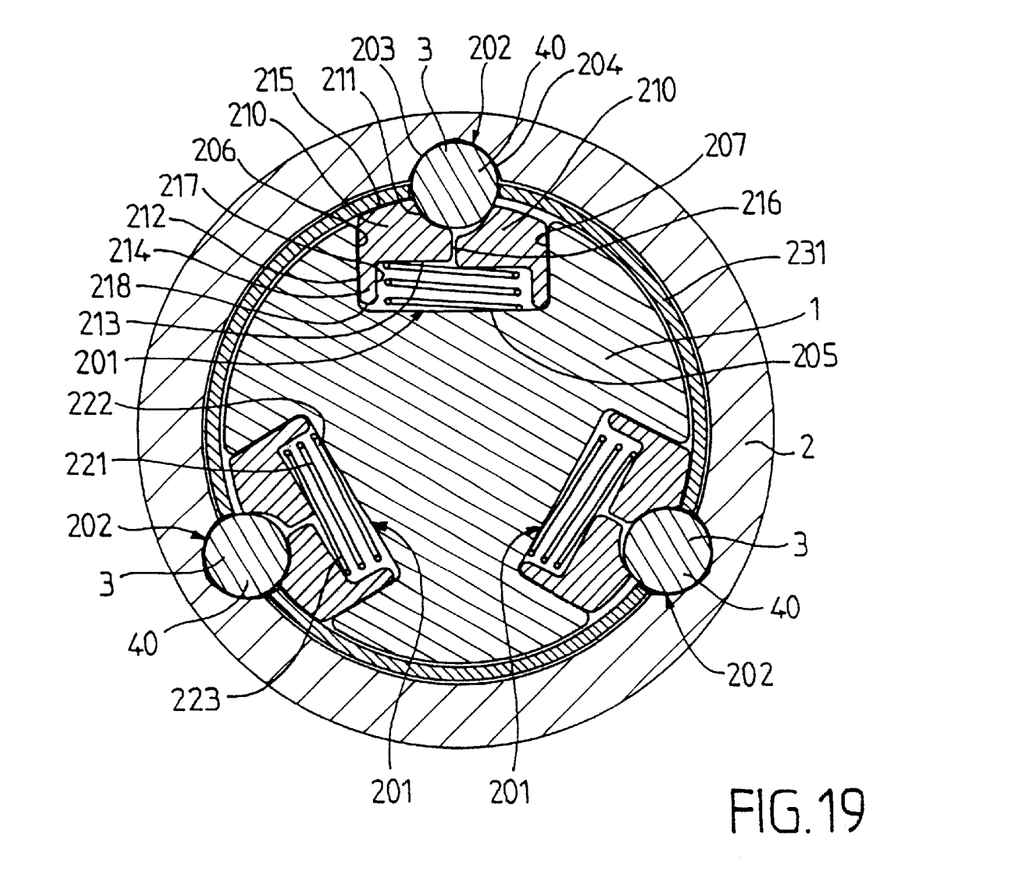
FIG. 19 is a view in cross section in the plane of FIG. 5 of another embodiment of the invention.
Figure 21:
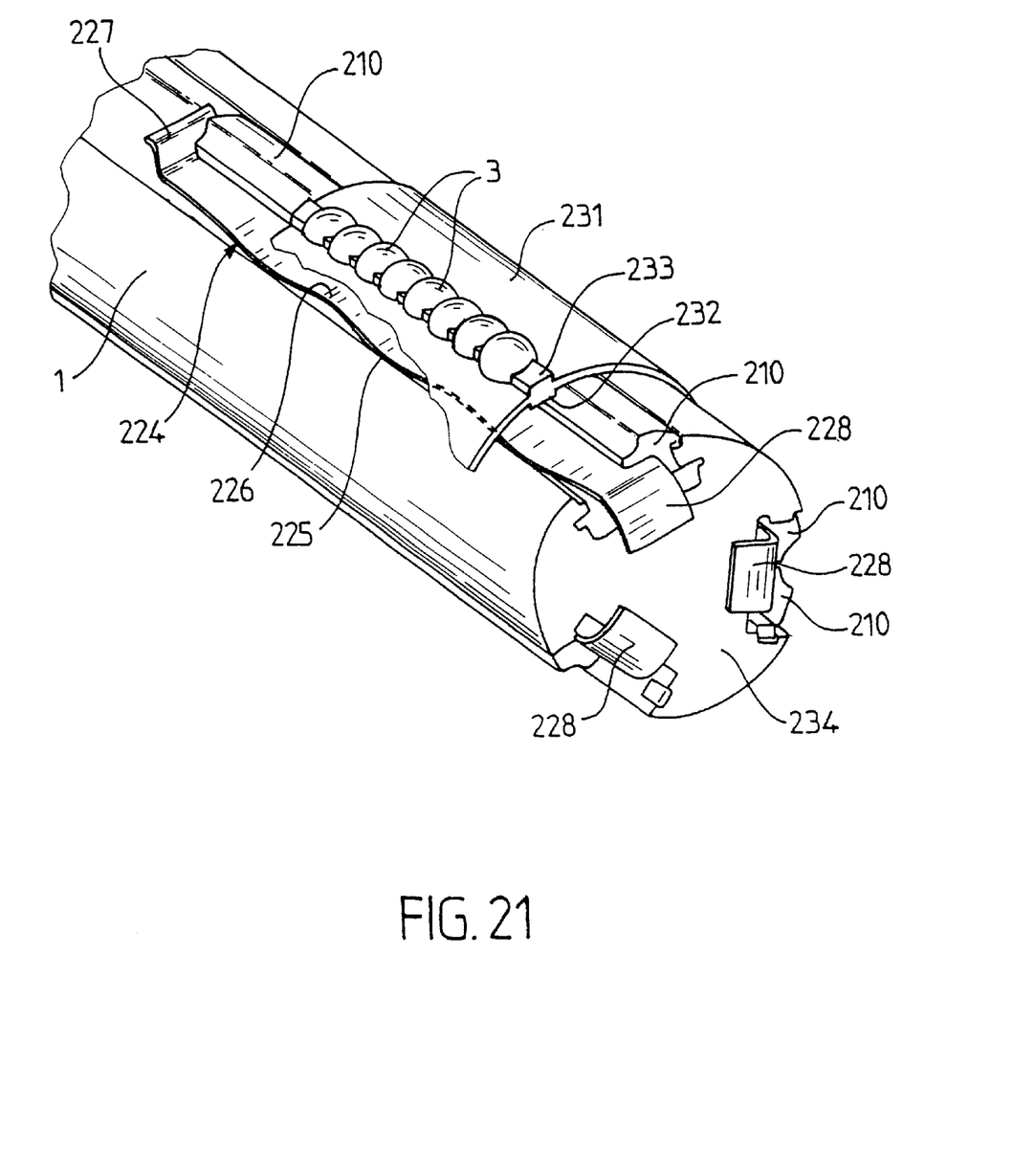
FIG. 21 is a partly cut away perspective view of the whole of the coupling system corresponding to FIG. 20.

In the embodiment shown in FIG. 19 the balls 3 are disposed in three axial rows 40. The axial rows 140 are at 120° to each other in the transverse direction. The balls 3 are held in place relative to each other by a single cage 231 in the form of a sleeve. For each row 40 of balls 3 the cage 231 has an inner axial tenon 232 and an outer axial tenon 233 (FIG. 21).

For each row 40 of balls 3 a concave part is formed in the outer shaft 2 in the form of an axial groove 202 whose section includes two concave faces 203, 204 inclined to each other and in bearing engagement with the balls.

For each row 40 of balls 3 a concave part is formed in the inner shaft 1 in the form of an axial groove 201 whose section includes a back 205 and two flanks 206, 207. The back 205 is substantially perpendicular to the diametral plane passing through its center.

For each row 40 of balls 3 there are two races 210 which are disposed in the concave part of the inner shaft 1 in the form of an axial groove 201. Each race 210 is in the form of an axial bar. The section of each race includes:

a concave face 211 in bearing engagement with the balls 3, two faces 213 and 212 which are contiguous with each other and which respectively face the back 205 and one of the flanks 206, 207 of the axial groove 201, a bead 214 which is formed on the face 213 at the corner of the face 212 and has an end 218 and an inside face 217, a face 216 substantially perpendicular to the back 205, and a convex outside face 215.

There is sufficient space between the two faces 216 of the two races 210.

For each row 40 of balls 3 there is a spring member which comprises coil springs 221. The coil springs 221 are disposed in the axial groove 201 between the beads 214 of the two races 210. The base 222 of said coil springs 221 bears on the back 205 of the axial groove 201 so that the end 223 of said coil springs 22f applies thrust to the two races 210.

Figure 20:
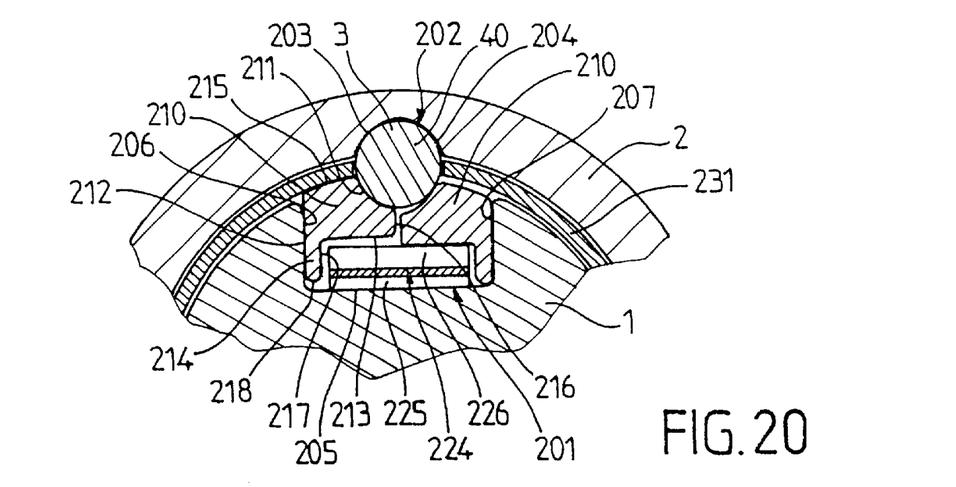
FIG. 20 is a partial view in cross section analogous to that of FIG. 19 showing a different embodiment of the invention.

In the embodiment shown in FIG. 20 the balls 3 are disposed in three axial rows 40. The axial rows 40 are at 120° to each other in the transverse direction. The balls 3 are held in place relative to each other by a single cage 231 in the form of a sleeve. For each row 40 of balls 3 the cage 231 has an inner axial tenon 232 and an outer axial tenon 233.

For each row 40 of balls 3 a concave part is formed in the outer shaft 2 in the form of an axial groove 202 whose section includes two concave faces 203, 204 inclined to each other and in bearing engagement with the balls.

For each row 40 of balls 3 a concave part is formed in the inner shaft 1 in the form of an axial groove 201 whose section includes a back 205 and two flanks 206, 207. The back 205 is substantially perpendicular to the diametral plane passing through its center.

For each row 40 of balls 3 there are two races 210 which are disposed in the concave part of the inner shaft 1 in the form of an axial groove 201. Each race 210 is in the form of an axial bar. The section of each race includes:

a concave face 211 in bearing engagement with the balls 3, two faces 213 and 212 which are contiguous with each other and which respectively face the back 205 and one of the flanks 206, 207 of the axial groove 201, a bead 214 which is formed on the face 213 at the corner of the face 212 and has an end 218 and an inside face 217, a face 216 substantially perpendicular to the back 205, and a convex outside face 215.

There is sufficient space between the two faces 216 of the two races 210.

For each row 40 of balls 3 a spring member in the form of an axial corrugated leaf spring 224. Said axial corrugated leaf spring 224 is disposed in the axial groove 201 between the beads 214 of two races 210. The axial corrugated leaf spring bears on the back 205 of the axial groove 201 to apply thrust to the two races 210.

Figure 22:
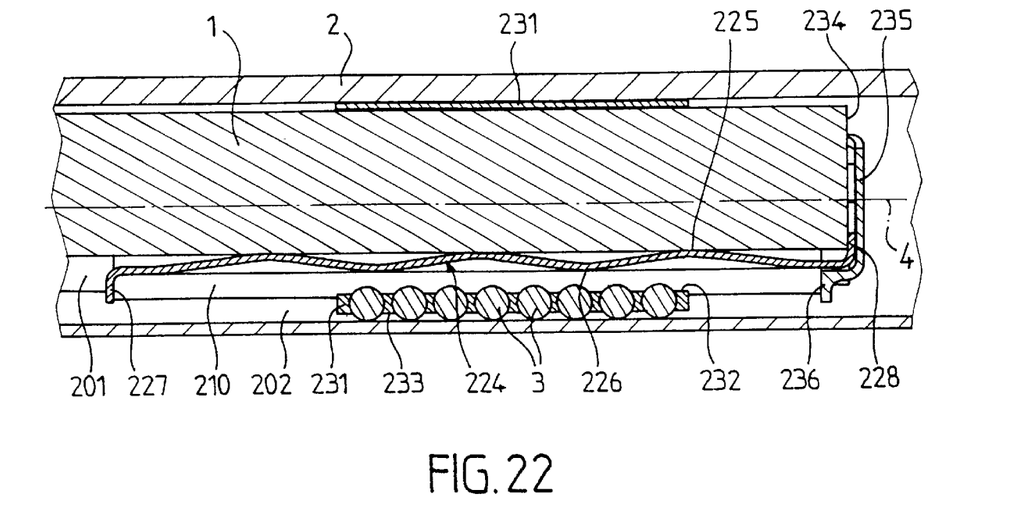
FIG. 22 is a view in axial section corresponding to FIG. 21.

In the embodiment shown in FIGS. 21 and 22 each axial corrugated leaf spring 224 has one axial end 227 which is curved outward and one axial end 228 which is curved inward. Outward means away from the axis 4 and inward means toward the axis 4. The external axial end 227 retains the axial end concerned of the corresponding two races 210. The internal axial end 228 bears against the end 234 of the inner shaft 1 through a thrust washer 235 which is attached to the end 234 of the inner shaft 1 by crimping lugs 236 to retain the other axial end of the two races 210.

Figure 23:
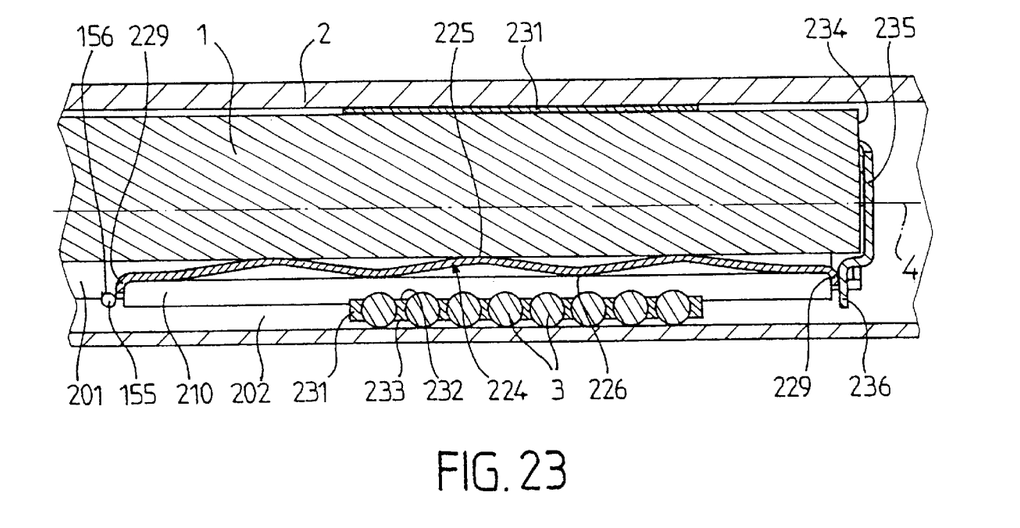
FIG. 23 is a view in axial section analogous to that of FIG. 22 and showing a different embodiment of the invention.

In the embodiment shown in FIG. 23 each axial corrugated leaf spring 224 has both axial ends 229 curved outward. One of the external axial ends 229 bears against a ring 155 mounted in a groove 156 formed on the inner shaft 1 to retain the axial end concerned of the corresponding two races 210.

The other external axial end 229 bears against a thrust washer 235 which is attached to the end 234 of the inner shaft 1 by crimping lugs 236 to retain the other axial end of the two races 210.

What is claimed is:

1. A steering column for an automobile, comprising:

(a) an inner shaft (1);

(b) a tubular outer shaft (2) arranged in concentrically spaced relation about said inner shaft for relative sliding movement along a common longitudinal axis;

(c) a plurality of rolling members (3) arranged between said inner and outer shafts, the adjacent surfaces of said inner and outer shafts containing a plurality of opposed axially-extending circumferentially spaced axial grooves receiving said rolling members, respectively, the grooves contained in one of said shafts comprising first grooves, each of said first grooves having a generally U-shaped cross-sectional configuration defining a bottom wall and a pair of side walls;

(d) a pair of axially extending races arranged in spaced relation in each of said first grooves adjacent the side walls thereof, respectively; and (e) a plurality of resilient means each arranged between the bottom wall of each of said first grooves and said races for biasing said races both outwardly toward the side walls of said first groove and upwardly toward the associated rolling members, respectively.

2. The steering column claimed in claim 1, wherein said rolling members are balls.

3. The steering column claimed in claim 2, wherein each of said resilient means comprises a single resilient member, said pair of races extending between said resilient member and said balls.

4. The steering column claimed in claim 3, wherein said balls are arranged in rows, and further including cage means retaining said balls in said rows;

(f) said outer shaft containing second axial grooves receiving said rows of balls, respectively,
(1) said second grooves including a pair of concave faces that are inclined relative to each other and are in bearing engagement with said balls;
(2) said first grooves having bottom walls that are each normal to a plane passing diametrically of the associated shaft through the center of said bottom wall;

(g) said pair of races each having a cross-sectional configuration including:
(1) a concave face in bearing engagement with said balls;
(2) a pair of contiguous faces which face said first groove bottom wall and one of said first groove side walls, respectively; and
(3) a face which is inclined to said first groove bottom wall;

(h) said resilient member having a circular cross section and being disposed between said races, and also between said races and said first groove bottom wall, respectively, said resilient member being arranged to apply thrust to said inclined faces of said races.

5. The steering column claimed in claim 4, wherein:

(f) said balls are disposed in three axial rows arranged at 120° relative to each other in a transverse plane:

(g) said inner shaft contains three axial grooves which are at 120° relative to each other in said transverse plane; and (h) said outer shaft contains three axial grooves which are at 120° relative to each other in said transverse plane.

6. The steering column claimed in claim 4, wherein:
(f) said balls are disposed in two diametrally opposed axial rows;
(g) said inner shaft contains two diametrally opposed axial grooves; and
(h) said outer shaft contains two diametrally opposed axial grooves.

7. The claimed in claim 4, wherein:
(f) said inner shaft contains three axial grooves which are arranged at 120° relative to each other in a transverse plane,
(g) said balls being arranged in three axial rows which are at 120° relative to each other in said transverse plane, said balls being held in place relative to each other by a cage in the form of a sleeve;
(h) an assembly comprising said sleeve, said balls, said races and said resilient means being closed at each axial end by a retaining ring which engages in each of said axial grooves of said inner shaft, one of said retaining rings bears against a ring which is mounted in a groove in said inner shaft; and
(i) said outer shaft contains three axial grooves which are arranged at 120° to each other in said transverse plane and which slide on said rows of balls, said axial grooves having a length enabling the desired axial sliding of said outer shaft relative to said inner shaft.

8. The claimed in claim 3, wherein:
(f) said second grooves are contained in said inner shaft, each of said second grooves including a pair of concave faces that are inclined relative to each other and are in bearing engagement with said balls;
(g) and further wherein said first axial grooves are contained in said outer shaft, said groove bottom walls being normal to a plane extending diametrically of said outer shaft;
(h) said races being mounted in said first grooves with each of said races having a cross-sectional configuration including:
  (1) a concave face in bearing engagement with said balls;
  (2) a pair of contiguous second faces adjacent said groove bottom wall and one of said groove side walls, respectively; and
  (3) a third face that is inclined relative to said groove bottom wall;
(i) said resilient member having a circular cross-section and being arranged in said first groove in contact with said bottom wall for applying thrust to said inclined surfaces of said races.

9. The steering column claimed in claim 3, wherein:
(f) said outer shaft contains said second grooves, each of said second grooves including a pair of concave faces that are inclined relative to each other and that are in engagement with said balls;
(g) said first grooves being formed on said inner shaft, each of said first grooves having a bottom wall that is normal to a plane extending diametrically of said inner shaft;
(h) said two races being arranged in said first groove, each of said races having a cross-sectional configuration including:
  (1) a concave face in engagement with said balls;
  (2) a pair of contiguous faces adjacent said groove bottom wall and one of said side walls, respectively; and
  (3) a bead that is formed at the juncture between said pair of contiguous faces;
(i) said resilient member have a cross-sectional configuration including a pair of bead portions arranged between and adjacent said race bead, respectively.

10. The steering column claimed in claim 2, and further wherein a pair of said resilient means are provided for biasing said races toward the associated balls, respectively.

11. The steering column claimed in claim 1, and further including:
(f) at least one retaining cage for retaining said rolling members in said axial grooves.

12. The steering column claimed in claim 11, wherein:
(g) said inner shaft contains said second axial grooves, said second axial grooves including a pair of concave faces that are inclined relative to each other and are in supporting bearing engagement with said balls;
(h) said first grooves being formed in said outer shaft and each including a bottom wall that is normal to a plane extending diametrically across said outer shaft;
(i) said pair of races being arranged in said first grooves, each of said races including:
  (1) a concave face in bearing engagement with said balls;
  (2) a pair of second contiguous faces adjacent said groove bottom wall and one groove side wall, respectively; and
  (3) a bead adjacent the juncture of said second faces;
(j) said resilient member having a cross-sectional configuration including a base adjacent said groove bottom wall, and a pair of proturberences that extend between and adjacent said race beads, respectively, said proturberances cooperating with said beads to displace races toward said ball and toward said groove side walls, respectively.

13. The steering column claimed in claim 11, wherein:
(g) said second grooves are formed in said outer shaft, said second grooves including a pair of curved faces that are inclined relative to each other and are in bearing engagement with said balls;
(h) said first grooves being contained in said inner shaft and including bottom walls that are normal to planes extending diametrically across said inner shaft;
(i) said two races being arranged within one of said first grooves, each of said races including:
  (1) a first face in bearing engagement with said balls;
  (2) second and third contiguous faces adjacent said groove bottom wall and one of said side walls, respectively; and
  (3) a fourth face contiguous with said second face, said fourth face being generally parallel with
(j) a plane passing diametrically through said inner shaft and the center of said groove bottom wall, the fourth faces of said two races being spaced from said groove bottom wall;
(k) a pair of said resilient members being arranged in the spaces between said first groove bottom wall and the fourth faces of said races, respectively.

14. The claimed in claim 11, wherein:
(g) said second grooves are contained in said inner shaft, said second grooves including two curved faces that are inclined relative to each other and are in bearing engagement with said balls;
(h) said first grooves being contained in said outer shaft with said bottom wall being arranged normal to a plane extending diametrically through said outer shaft;

(i) each of said races having a cross-sectional configuration including:
  (1) a first face in bearing engagement with said balls;
  (2) second and third faces that are contiguous and arranged adjacent said groove bottom wall and one of said side walls; and
  (3) a fourth face contiguous with said second face and generally parallel with a plane passing diametrically of said outer shaft through the center of said bottom wall, said fourth face being spaced from said groove bottom wall;
(j) and further wherein a pair of resilient members are arranged in the spaced between said race fourth walls and said groove bottom wall for biasing said races toward said balls.

15. The steering column claimed in claim 11, wherein:
(g) said second grooves are contained in said outer shaft, each of said second grooves including a pair of concave faces that are inclined relative to each other and that are in bearing engagement with said balls;
(h) said first grooves being contained in said inner shaft, each of said first grooves including a bottom wall that is normal to the plane that extends diametrically of said inner shaft through the center of said bottom wall;
(i) each of said races having a cross-sectional configuration including.
  (1) a concave face in bearing engagement with said balls;
  (2) a pair of contiguous second faces facing said groove bottom wall and one of said side walls, respectively; and
  (3) a bead parallel with one of said groove side walls;
(j) said resilient means comprising a pair of helical coil springs arranged respectively between the groove bottom wall and said races for cooperation with said beads to bias said races toward said balls.

16. The steering column claimed in claim 11, wherein:
(g) said second grooves are contained in said outer shaft, each of said second grooves including a pair of concave forces that are inclined relative to each other and are in bearing engagement with said balls;
(h) said first grooves being contained in said inner shaft, the bottom wall of each of said first grooves being normal to the plane passing diametrically across said inner shaft through the center of said bottom wall;
(i) each of said races including:
  (1) a concave face in bearing engagement with said balls;
  (2) a pair of contiguous faces that face said groove bottom wall and one of said side walls, respectively; and
  (3) a bead parallel with one of said groove side walls;
(j) said resilient means comprising a corrugated leaf spring arranged axially in each said first grooves, said leaf spring reacting between said groove bottom wall and the beads of said races for biasing said races toward said balls.

17. The steering column claimed in claim 16, wherein each axial corrugated leaf spring has a first axial end which is curved outward, and a second axial end which is curved inward, said first axial end retaining a, first axial end of said two races, and said second axial end bearing against the end of said inner shaft through a thrust washer which is attached to the end of the inner shaft, thereby to retain a second axial end of the two races.

18. The steering column claimed in claim 16, wherein said axial corrugated leaf spring has two axial ends curved outward, one said axial ends bearing against a ring mounted in a groove formed on the inner shaft to retain a first axial end of said two races, and the other of said axial ends bearing against a thrust washer which is attached to the end of the inner shaft, thereby to retain a second axial end of said two races.

19. The steering column claimed in claim 1, further including cooperating male projections (34) and female grooves formed on the adjacent surfaces of said inner and outer shafts so that torque can still be transmitted between said inner shaft and said outer shaft if said balls should rupture.

20. The steering column claimed in claim 1, wherein said resilient means is disposed in said inner shaft.

21. The steering column claimed in claim 1, wherein said resilient means is disposed in said outer shaft.

22. The steering column claimed in claim 1, wherein each of the opposed surfaces of said inner and outer shafts contains at least one of said first grooves, and further wherein first resilient means are disposed in each first groove contained in said inner shaft, and second resilient means are disposed in each first groove contained in said outer shaft.

* * * * *